United States Patent [19]
Rogers, Jr.

[11] Patent Number: 5,553,898
[45] Date of Patent: Sep. 10, 1996

[54] HOT-TAPPING SLEEVE

[75] Inventor: Elmer V. Rogers, Jr., North Olmsted, Ohio

[73] Assignee: The Pipe Line Development Company, Westlake, Ohio

[21] Appl. No.: 491,361

[22] Filed: Jun. 30, 1995

[51] Int. Cl.$^6$ .................................................. F16L 5/00
[52] U.S. Cl. ....................... 285/197; 285/328; 285/422; 137/317
[58] Field of Search ........................... 285/328, 197, 285/18, 422; 137/317

[56] References Cited

U.S. PATENT DOCUMENTS

| | | | |
|---|---|---|---|
| 3,252,192 | 5/1966 | Smith | 24/81 |
| 3,685,545 | 8/1972 | Smith et al. | 285/328 X |
| 3,807,435 | 4/1974 | Fenster et al. | 285/197 X |
| 4,168,089 | 9/1979 | Hulslander et al. | 285/328 X |
| 4,415,000 | 11/1983 | Odmann | 137/318 |
| 4,477,105 | 10/1984 | Wittman et al. | 285/18 |
| 4,613,171 | 9/1986 | Corcoran | 285/197 |
| 4,789,189 | 12/1988 | Robertson | 285/328 X |
| 5,170,813 | 12/1992 | Francis | 285/197 X |
| 5,275,013 | 1/1994 | Price et al. | 285/197 X |
| 5,374,087 | 12/1994 | Powers | 285/197 |

Primary Examiner—Dave W. Arola
Attorney, Agent, or Firm—Pearne, Gordon, McCoy & Granger

[57] ABSTRACT

A hot-tapping sleeve is provided for tapping a main pipe and attaching a branch pipe. The tapping sleeve includes a split sleeve having first and second sleeve members which together form a circular bore for receiving a portion of the main pipe. The first and second sleeve members each form approximately one half of the circular bore. A plurality of clamping members pass through associated holes in the first and second sleeve members to clamp the first and second sleeve members together with the main pipe therebetween. A side branch is attached to the first sleeve member which has an opening in fluid communication with the circular bore. A sheet type packing member is located around the opening and is only between the first sleeve member and the main pipe. A metal spray is located on the second sleeve within the circular bore and engages the main pipe for resisting axial displacement of the main pipe to permit tapping of the main pipe while the main pipe is under fluid pressure.

1 Claim, 3 Drawing Sheets

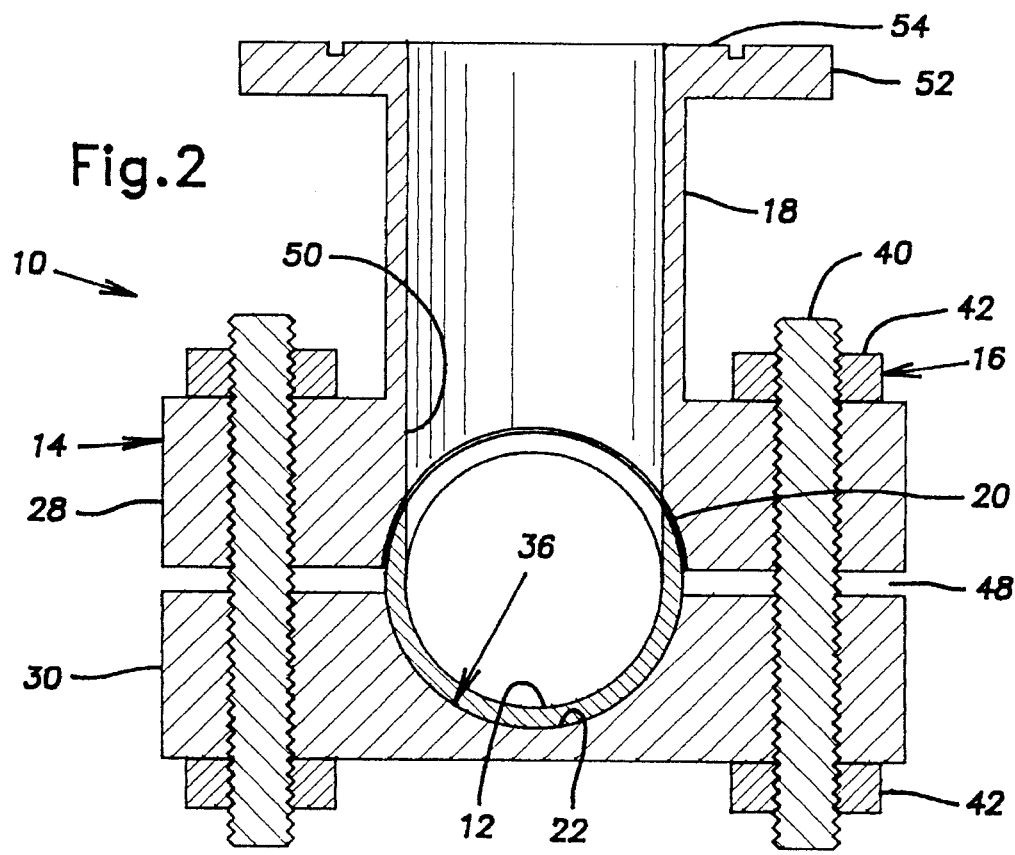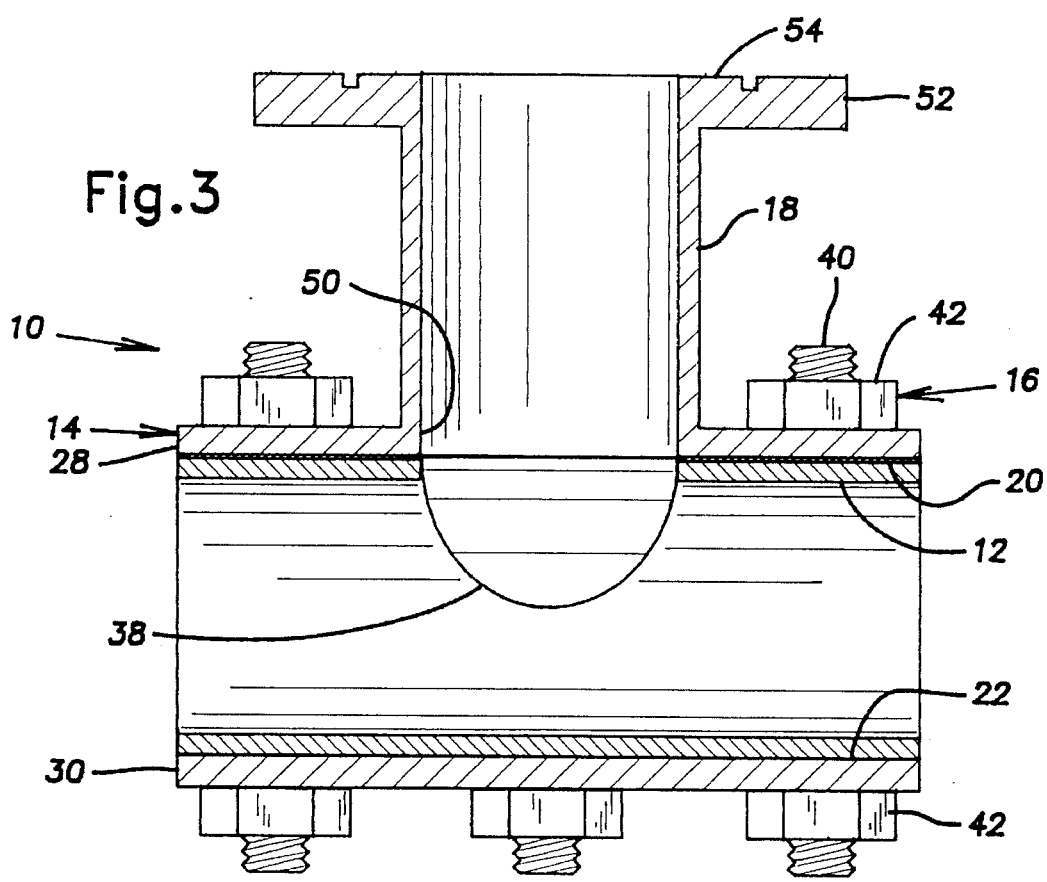

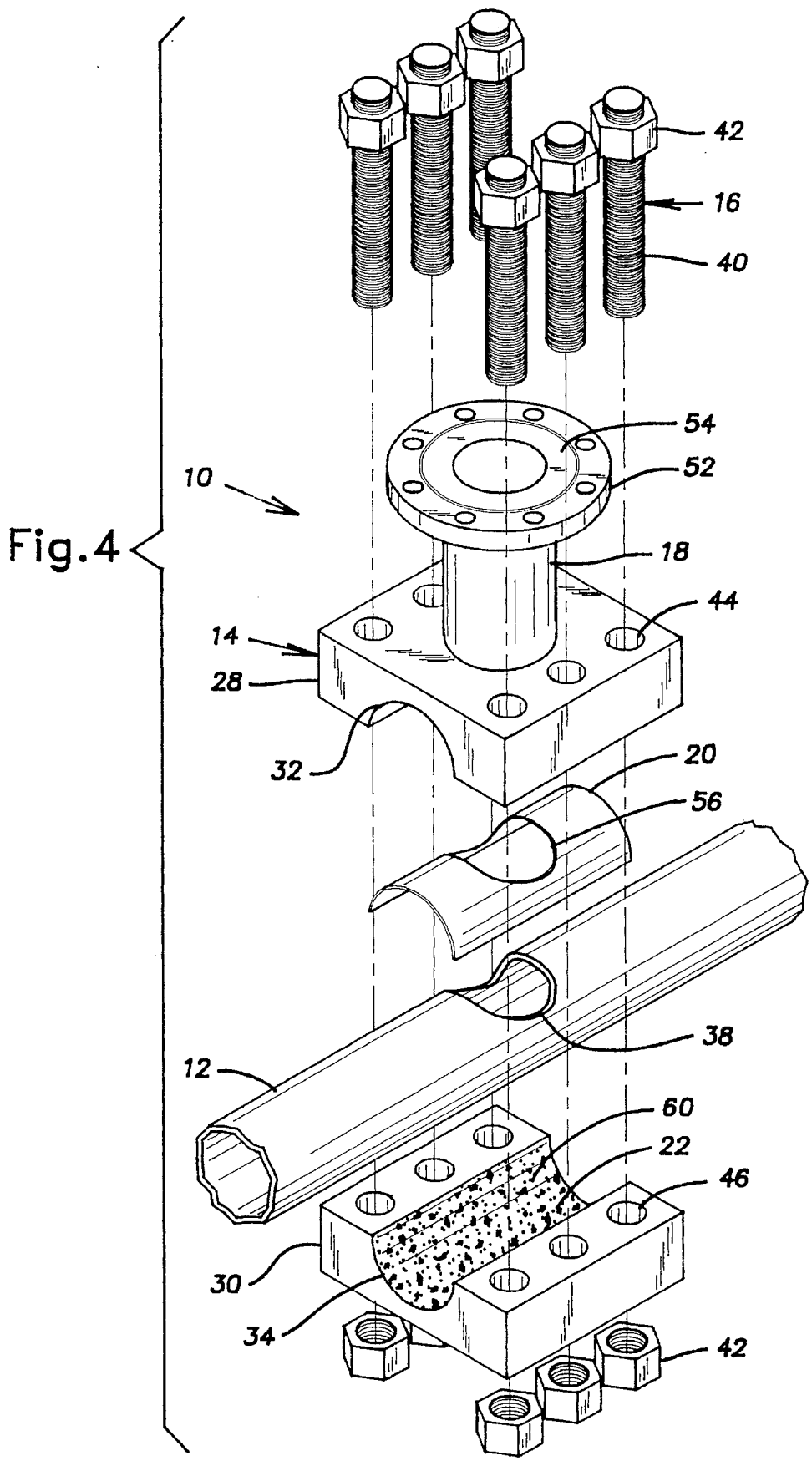

HOT-TAPPING SLEEVE

BACKGROUND OF THE INVENTION

1. Field of the Invention

The present invention relates in to general to pipeline connectors and, more particularly, to tapping sleeves for use in attaching a branch pipeline in a fluid supply system.

2. Description of Related Art

A known type of tapping sleeve for attaching a branch pipeline takes the form of a split sleeve which is clamped over the main pipeline to be tapped. A pair of shell gaskets or packing rings are provided that seal between the tapping sleeve and the main pipeline. The shell gaskets are on opposite axial sides of a side opening in the split sleeve for the branch pipe and extend completely around the circumference of the main pipeline.

Another known type of tapping sleeve for attaching a branch pipeline also takes the form of a split sleeve which is clamped over the main pipeline to be tapped. A branch gasket is provided that seals between the tapping sleeve and the main pipeline. The branch gasket encircles a side opening in the split sleeve for the branch pipe.

The manufacture and installation of these related art tapping sleeves has been made difficult and correspondingly expensive by the need for packing grooves and/or retaining rings. Additionally, the tapping sleeves may not adequately lock the main pipeline against relatively high axial forces which may be exerted. For example, when repairing or altering an existing fluid supply system the tapping sleeve may be installed on a pressurized pipeline, the tapping sleeve may be installed in conjunction with a stoppling machine that sets a plug on one side of the main pipeline, and the tapping sleeve may be tapping size on size pipelines, that is, pipelines having generally equal inner diameters. When large axial forces are applied, the related art tapping sleeves may require additional axial support, this can be provided, for example, by end clamps or by welding the tapping sleeve to the main pipeline. Where there is a weld hazardous environment or where the tapping sleeve is to be reclaimed, however, the tapping sleeve cannot even be welded to the main pipe. Accordingly there is a need in the art for an improved tapping sleeve.

SUMMARY OF THE INVENTION

The present invention provides a tapping sleeve for attaching a branch pipe line to a main pipeline that overcomes the limitations of the related art. The tapping sleeve includes a split sleeve having first and second sleeve members which together form a circular bore for receiving a portion of the main pipe. A plurality of clamping members are provided to clamp the first and second sleeve members together with the main pipe therebetween. A side branch is attached to the first sleeve member which has an opening in fluid communication with the circular bore. The branch pipeline is attached to the side branch such that fluid can flow between the branch pipeline and the main pipeline. A packing member is located around the opening and between the first sleeve member and the main pipe to seal the tapping sleeve to the main pipeline. A high friction gripping surface is located between the second sleeve member and the main pipe for resisting axial displacement of the main pipe.

BRIEF DESCRIPTION OF THE DRAWINGS

These and further features of the present invention will be apparent with reference to the following description and drawings, wherein:

FIG. 2. is a end elevational view, in cross-section, of the hot-tapping sleeve as viewed along line 2—2 of FIG. 1;

FIG. 3 is a side elevational view, in cross-section, of the hot-tapping sleeve as viewed along line 3—3 of FIG. 1; and FIG. 4 is an exploded view of the hot tapping sleeve of FIG. 1.

DETAILED DESCRIPTION OF THE PREFERRED EMBODIMENT

Figure 1:
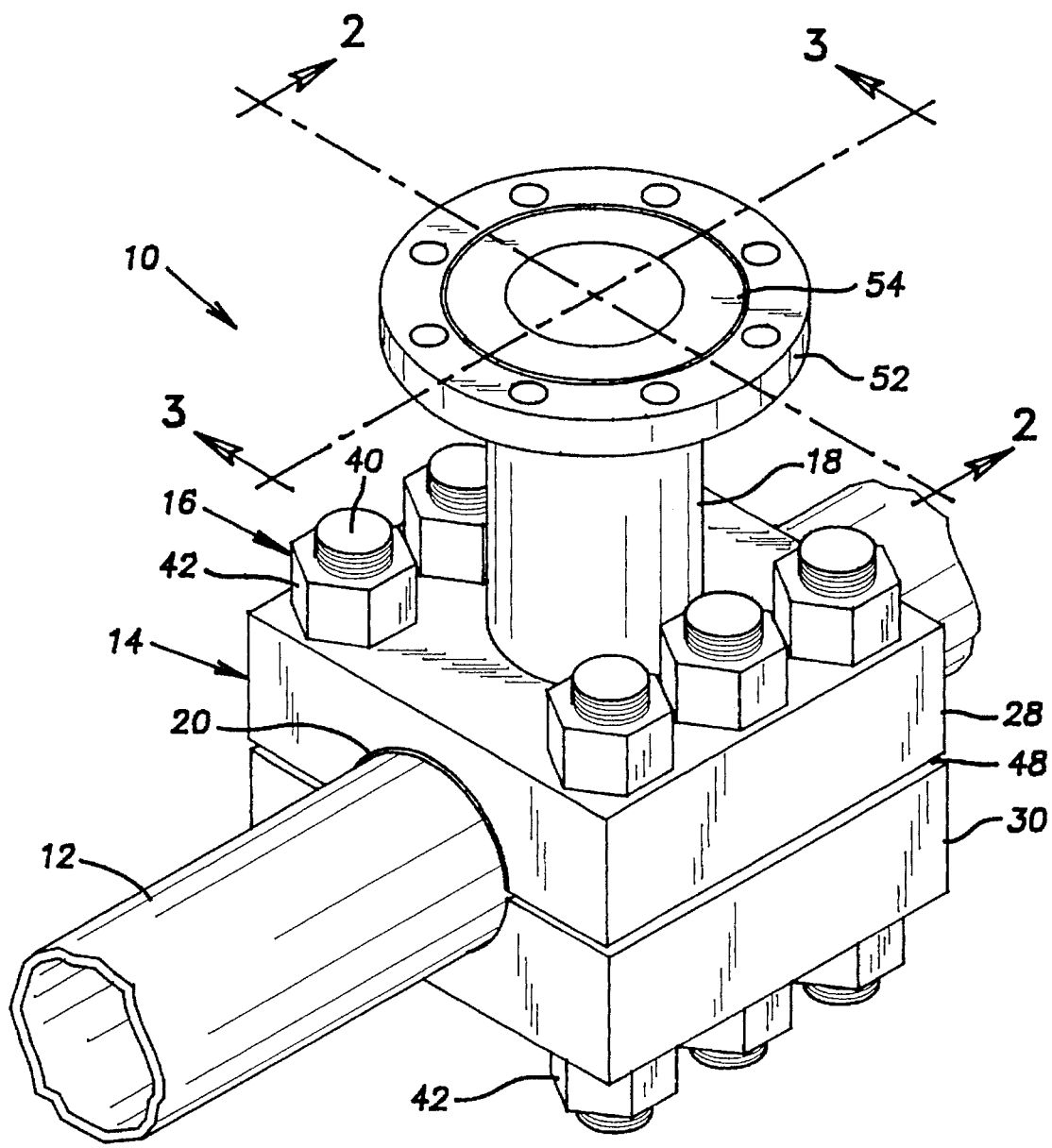
FIG. 1 is a perspective view of a hot-tapping sleeve according to the invention.

Referring to FIGS. 1–4, there is shown a tapping sleeve 10 according to the invention for tapping a main steel pipeline 12, or other rigid conduit for carrying fluids, and attaching a branch steel pipeline, or other rigid conduit for carrying fluids (not shown) in a fluid supply system. The tapping sleeve 10 is particularly suited for repair or alteration of existing pipelines because the tapping sleeve can be installed on a "hot", that is pressurized, main pipeline 12 and/or in conjunction with a stoppling or plugging machine, both of which can result in relatively large axial forces on the pipeline 12. The tapping sleeve 10 is also particularly suited for tapping size on size pipelines, that is pipelines having generally equal inner diameters, which process removes almost one-half of the diameter of the pipeline wherein the chances of a weak pipeline axially breaking in two are increased. The tapping sleeve 10 is further particularly suited for use where there is a weld hazardous environment such as, for example, in refineries where surrounding conditions do not permit the immediate installation of a welded branch or where the tapping sleeve 10 is to be reclaimed, reconditioned, and reused.

The tapping sleeve 10 includes a split sleeve 14, a plurality of clamping members 16, a side branch 18, a packing member or gasket 20, and a high friction gripping surface 22. The split sleeve 14 includes a first or upper sleeve member 28 and a second or lower sleeve member 30. The sleeve members 28, 30 are generally rectangularly-shaped and each has a generally semi-circularly shaped recess 32, 34 which together form a circular bore 36 for receiving a portion of the main pipeline 12. It is noted that the sleeve members 28, 30 could alternatively have other shapes such as, for example, cylindrical with outwardly extending bolt lugs or flanges.

The diameter of the circular bore 36 is sized relative to the outside diameter of the main pipeline 12 so that the tapping sleeve 10 fits closely around the main pipeline 12. Each of the pipelines is a standard cylindrical steel pipe, typically having an inner diameter in the range of about 2 inches to about 30 inches and typically pressurized in the range of about 500 p.s.i. to about 1000 p.s.i. During installation of the tapping sleeve 10, a side opening 38 with a diameter generally equal to the inner diameter of the branch pipeline is cut or drilled into the main pipeline 12 to allow fluid to flow between the main pipeline 12 and the branch pipeline.

The plurality of clamping members 16 are provided to clamp the first and second sleeve members 28, 30 together with the main pipeline 12 therebetween and extending through the circular bore 36. The clamping members 16 of the illustrated embodiment include threaded studs 40, nuts 42, and Openings or holes 44, 46 in the first and second sleeve members 28, 30 generally perpendicular to a plane bisecting the split sleeve 14 and the circular bore 36. It is noted however that other suitable means for clamping could be utilized. A first series of holes 44 is provided on each side of the first sleeve member 28 which are aligned with a second series of corresponding holes 46 in the second sleeve member 30. One of the studs 40 extends through each pair of corresponding holes 44, 46 and extends outward from the outer surface of each sleeve member 28, 30. One of the nuts 42 is threadably engaged on each end of each of the studs 40 and engages the outer surface of the corresponding sleeve member 28, 30. The quantity and size of the studs 40 and nuts 42 are selected to provide an adequate clamping load for sealing the tapping sleeve 10. Preferably, a clamping pressure of at least about 2500 p.s.i. is obtained. It is noted that the first and second sleeve members 28, 30 are milled at inner surfaces so that a gap or space 48 remains between them to ensure a full clamping load.

The first sleeve member 28 has a circular side opening 50 perpendicular to and in fluid communication with the circular bore 36. The side opening 50 has a diameter generally equal to the inner diameters of the side branch 18 and the branch pipeline. The side branch 18 is attached to the first sleeve member 28 around the side opening 50 by any suitable means such as, for example, welding. The side branch 18 includes a flange 52 with seal 54 to sealably secure the branch pipeline to the tapping sleeve 10 and the main pipeline 12. The side branch 18 of the illustrated embodiment is sized for a branch pipeline having an inner diameter generally equal to the diameter of the main pipeline 12.

The packing member 20 is located around the side opening 50 and between the first sleeve member 28 and the main pipeline 12 for sealing fluid pressure between the first sleeve member 28 and the main pipeline 12. The packing member 20 of the illustrated embodiment is a preformed sheet type packing. The packing member 20 is rectangularly-shaped and sized to engage the entire surface of the recess 32 in the first sleeve member 28, that is, only one-half of the circular bore 36 of the split sleeve 14. The packing member 20 preferably has a preformed circular opening 56 aligned with the side opening 50 in the first sleeve member 28 and the cut side opening 38 in the main pipeline 12. The opening 56 in the packing member 20 can alternatively be cut when cutting the side opening 38 in the main pipeline 12.

The packing member 20 is preferably formed from a material which can withstand a high temperature and/or corrosive environment such as, for example, graphoil which withstands temperatures up to about 1200 degrees Fahrenheight (F.), gortex which withstands temperatures up to about 600 degrees F., or any suitable material which can withstand temperatures up to at least about 300 degrees F. and withstand fluids having a wide range of p.h. values. It is noted, however, that other suitable materials may be used that meet the requirements of the operating conditions.

The high friction gripping surface 22 is located between the second sleeve member 30 and the main pipeline 12 for resisting axial displacement of the main pipeline 12 relative to the tapping sleeve 10. The gripping surface 22 is sized to cover the entire surface of the recess 34 in the second sleeve member 30, that is, only one-half of the circular bore 36 of the split sleeve 14. The length of the second sleeve member 30 is sized to provide an adequate gripping force which is a directly related to gripping area.

The gripping surface 22 of the illustrated embodiment is a metal spray on the surface of the recess 34 of the second sleeve member 30. The metal spray provides relatively hard and relatively small gripping particles or grit 60. When the clamping force is applied, the particles 60 partially embed into the outer surface of the main pipeline 12 to act as an axial clamp which locks the main pipeline 12 in the split sleeve 14 even if the main pipeline is axially pressured or breaks apart within the split sleeve 14. Small indentations in the main pipeline 12 do not damage the wall nor produce any appreciable distortion which could interfere with use of the main pipeline 12. The clamping load, the thickness of the packing member 20, and the height of the particles must all be sized such that the main pipeline 12 can not come out of the particles 60 by compressing the packing member 20.

The metal spray is preferably applied in a conventional manner as typically used to build up the diameter of a shaft. A metal is melted and sprayed under pressure onto the surface so that it is welded onto the surface and a gritty or high friction surface is obtained having the small particles 60. The metal particles preferably have a hardness substantially greater than the main pipeline 12 so that they will embed into the outer surface of the main pipeline 12. Preferably, the metal is a stainless steel, a high carbon steel, or other suitable material providing adequate hardness and corrosion resistance.

In operation, the tapping sleeve 10 is installed by placing the first and second sleeve members 28, 30 around the main pipeline 12 at a location where the branch pipeline is to be attached. The opposing holes 44, 46 in the sleeve members 28, 30 are aligned and the sleeve members 28, 30 are connected with the studs 40 and nuts 42. The nuts 42 are tightened until the required clamping pressure is obtained. With the first and second sleeve members 28, 30 are bolted in place, the packing member 20 is compressed between the first sleeve member 28 and the main pipeline 12 and the gripping surface 22 is between the second sleeve member 30 and the main pipeline 12. Preferably, the gripping surface is firmly attached to the second sleeve member 30 as by the described spray welding process and embedded into the outer surface of the main pipeline 12. Attached in this manner, both the packing member 20 and gripping surface 22 provide axial support.

Once the sleeve members 28, 30 are properly secured, tapping equipment is assembled and a hydrotest is performed to check the seal of the tapping sleeve 10. If the seal of the tapping sleeve 10 is effective, the side opening 38 in the main pipeline is cut or drilled through the side openings in the side branch 18 and the first sleeve member 28. Once completed, the branch pipeline is attached to the flange 52 on the side branch 18. Fluid can then flow between the main pipeline 12 and the branch pipeline.

The tapping sleeve 10 according to the present invention has several advantages over the prior art. The tapping sleeve 10 can be used to tap a pressurized pipeline, to tap size on size pipelines, or to tap pipelines in conjunction with a stoppling, because the packing member and gripping surface 22 axially lock the main pipeline 12 relative to the tapping sleeve 10. Additionally, the tapping sleeve 10 can be attached to the main pipeline 12 in a weld hazardous environment because the tapping sleeve 10 only needs to be bolted in place. Furthermore, the tapping sleeve 10 eliminates the use of support girdering or clamps, and the need for packing grooves, making the tapping sleeve 10 relatively inexpensive, easy to manufacture, and easy to install.

While the invention have been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A tapping sleeve for attaching a branch pipe to a main pipe, said tapping sleeve comprising:

a split sleeve having first and second sleeve members which together form a circular bore for receiving a portion of the main pipe, said first sleeve member and said second sleeve member each forming approximately one half of said circular bore;

a plurality of clamping members passing through associated holes in said first and second sleeve members to clamp said first and second sleeve members together with the main pipe therebetween;

a side branch attached to said first sleeve member having an opening in fluid communication with said circular bore;

a sheet type packing member located around said opening and throughout a major portion of the area between said first sleeve member and the main pipe; and a metal particulate coating spray welded throughout a major portion of the surface area of the interior of said second sleeve member and engageable with the main pipe for resisting axial displacement of the main pipe to permit tapping of the main pipe while the main pipe is pressurized, said particulate coating having a hardness greater than that of the pipe to ensure that elements of the particulate coating are embedded into the pipe for adequate axial gripping of the pipe.

* * * * *